United States Patent [19]

Gannaway

[11] Patent Number: 4,863,103
[45] Date of Patent: Sep. 5, 1989

[54] COMBINATION SINK SPRAY AND WATER FILTER APPARATUS

[76] Inventor: Richard M. Gannaway, 1845 So. Highland, Bldg. 11, Clearwater, Fla. 34616

[21] Appl. No.: 109,897

[22] Filed: Oct. 19, 1987

Related U.S. Application Data

[63] Continuation-in-part of Ser. No. 883,230, Jul. 8, 1986, abandoned.

[51] Int. Cl.⁴ .................................................. B01D 27/08
[52] U.S. Cl. ..................................... 239/289; 239/25; 239/575; 239/590
[58] Field of Search .................... 239/28, 29, 24–27, 239/590, 289, 575, 590.3, 590.5, DIG. 23, 600; 210/282, 449; 222/189, 509; 4/619, 624

[56] References Cited

U.S. PATENT DOCUMENTS

| | | | |
|---|---|---|---|
| 1,124,693 | 1/1915 | Brown | 239/29 |
| 1,175,137 | 3/1916 | Doucette | 239/25 |
| 1,241,552 | 12/1929 | Bohn | 239/29 |
| 2,395,227 | 2/1946 | Lewis | 239/575 X |
| 2,973,905 | 3/1961 | Ackley | 239/575 X |
| 3,108,748 | 10/1963 | Fiore | 239/25 |
| 3,529,726 | 9/1970 | Keenan | 210/282 X |
| 4,107,046 | 8/1978 | Corder | 210/449 X |

Primary Examiner—Andres Kashnikow
Assistant Examiner—Kevin P. Weldon
Attorney, Agent, or Firm—Herbert W. Larson

[57] ABSTRACT

An apparatus combining a sink spray with a water filter to provide alternate use from the same location on a sink. The sink spray contains a valve housing which is inserted at one end into an inlet opening in the water filter to actuate a separate valve in the water filter and permit flow of water into the water filter from a water conduit attached by an annular hose connection to the other end of the sink spray valve housing. The water filter is rotatably mounted on the valve housing and encloses a filter cartridge which filters tap water and provides quality drinking water through an outlet opening from the water filter.

15 Claims, 4 Drawing Sheets

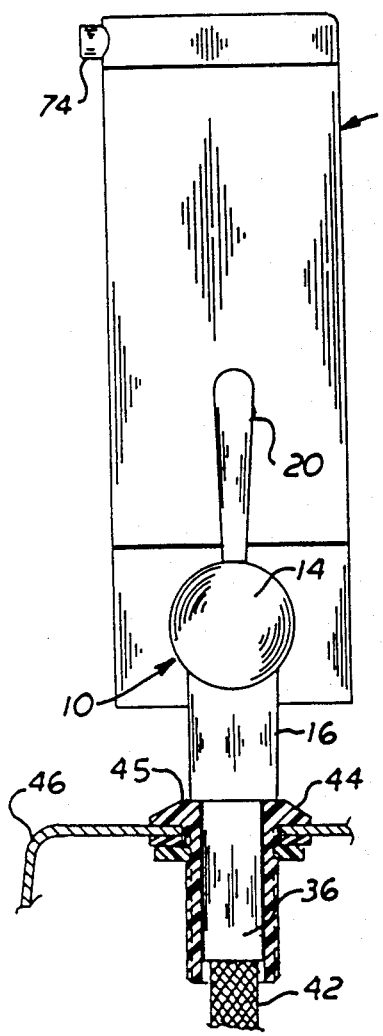
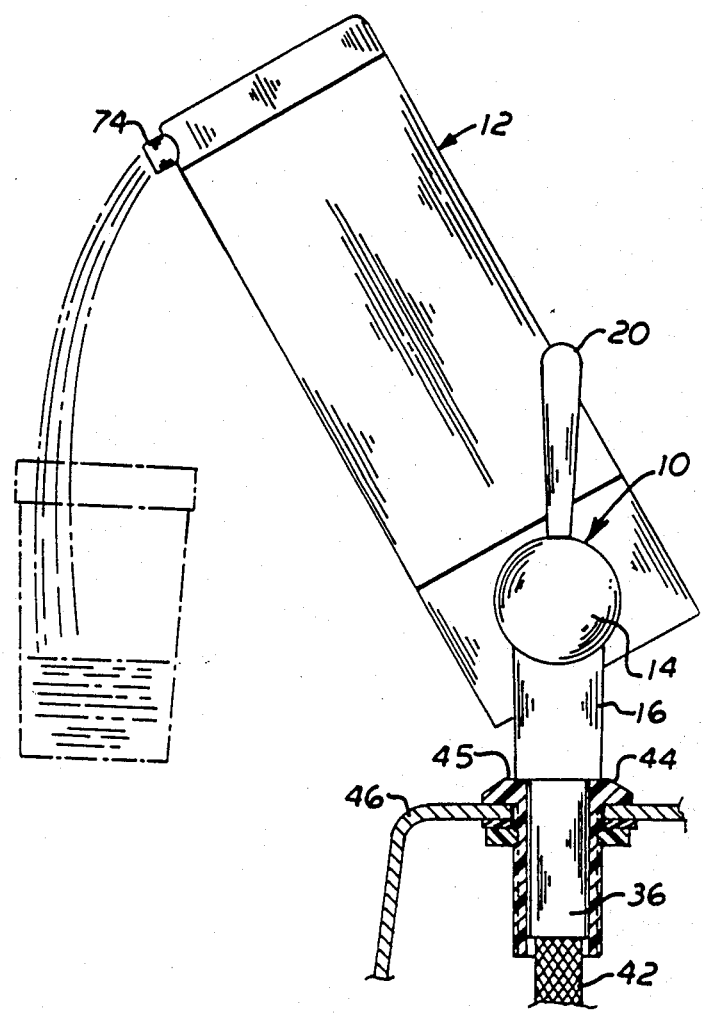
FIG. 5
FIG. 7
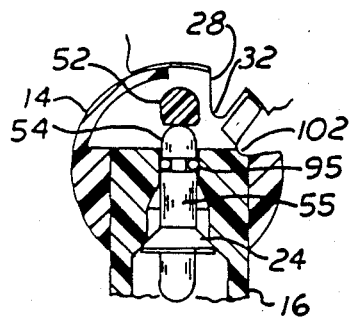
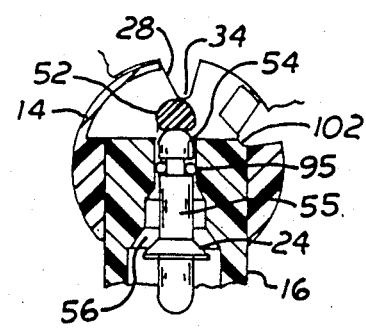
FIG. 6
FIG. 8

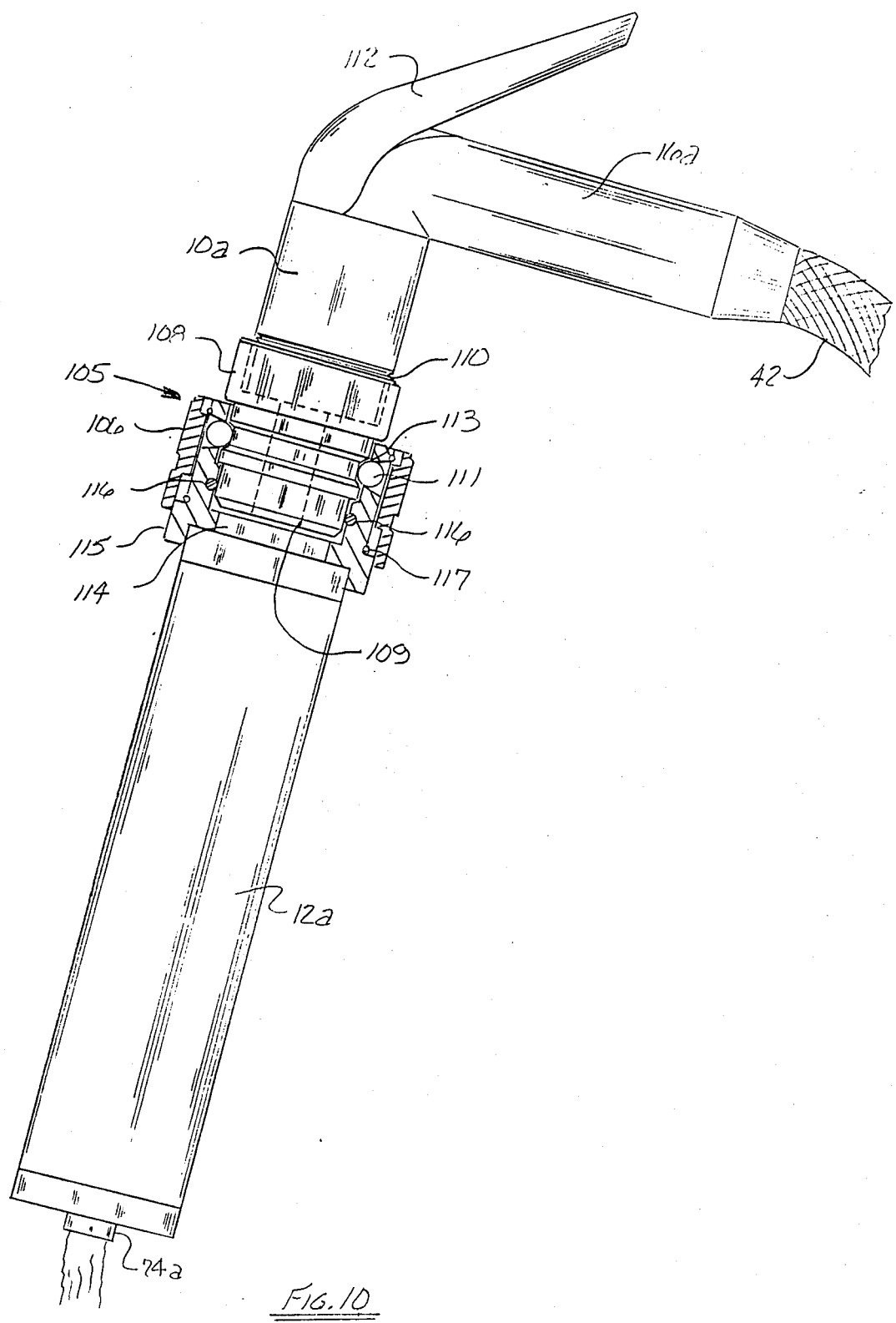

4,863,103

COMBINATION SINK SPRAY AND WATER FILTER APPARATUS

BACKGROUND OF THE INVENTION

1. Prior Applications.

This application is a continuation-in-part of application Ser. No. 883,230 filed July 8, 1986, now abandoned, and is related to my application Ser. No. 931,091 filed Nov. 17, 1986, now U.S. Pat. No. 4,761,839.

2. Field of the Invention.

This invention relates to a sink spray. More particularly, it refers to a combination apparatus alternatively suitable as a sink spray or a water filter with a unique conversion feature so that the apparatus can be easily converted from a sink spray to a water filter and back to a sink spray.

3. Description of the Prior Art.

Sink sprays are well known products and are currently found as a fixture in most homes, apartments and commercial kitchen facilities. Typical sink sprays are described in U.S. Pat. Nos. 3,498,546; 4,344,578; and 4,148,438. Another rapidly growing kitchen utility product is a water filter device for producing quality drinking water from normal tap water. Such filter devices were discussed in an article by Consumer Reports dated February, 1983, pages 68-73 and page 102. This article points out that most water filters are attached to the home faucet outlets. Under the sink filters typically filter all water coming out of the sink faucets including water not needed for human consumption. Such a device shortens the life of the filter cartridge since it is used for larger quantities of water than is required. Sink-mounted filters are either attached to the end of the regular sink faucet, where it suffers the same limitations as the under sink filters, or are mounted in a separate unit on the counter next to the sink. On these latter units a fitting on the faucet either directs water to the filter unit or allows normal, unfiltered water to come out of the tap. This is a useful and convenient filter unit since it allows the homeowner to limit the filter use solely to the drinking water. The limitation to this system is the counter space taken up by the unit and such space near a sink is at a premium. An improved filter unit is needed that takes up less counter space but still allows use to be restricted solely to drinking water.

SUMMARY OF THE INVENTION

I have invented a drinking water filter apparatus that can be attached to the spray hose water conduit mounted on most kitchen sinks. By operation of a self-contained lever the apparatus permits normal tap-water flow through the spray unit, but alternately a water filter can be rotatably mounted on a valve housing of the spray unit to provide production of filtered water through the filter unit.

My apparatus combines a device for spraying water affixed to a flexible water conduit with a water filter device so that one can easily switch from the spray mode to the water filtration mode. The spray unit contains an annular hose connector attached to a sink's standard flexible conduit. The annular hose connector is in turn attached to a valve housing containing a two-way valve and means for rotatably attaching the valve housing to the water filter device. The filter device comprises a housing containing a water filter cartridge and a two-way valve for permitting water to flow from the spray unit through the filter cartridge to a water outlet. Movement of the water filter device downward about 30 degrees with respect to its upright mounting position causes a locking tab on the water filter device to depress the two-way valve within the spray unit valve housing to allow water to flow to the filter cartridge and exit in a purified state.

BRIEF DESCRIPTION OF THE DRAWINGS

The present invention may be best understood by those having ordinary skill in the art by reference to the following detailed description when considered in conjunction with the accompanying drawings in which:

FIG. 5 is a side elevation view partially in section showing the sink spray and water filter apparatus in a non-operating mode.

FIG. 6 is a detailed sectional view of the sink spray two-way valve closed and the valve housing exterior surface features when the apparatus is in the FIG. 5 non-operating mode.

FIG. 7 is a side elevation view partially in section showing the sink spray and water filter apparatus in an operating mode.

FIG. 8 is a detailed sectional view of the sink spray two way valve open and the valve housing exterior surface features when the apparatus is operating according to FIG. 7.

FIG. 10 is a side view partially in section of a sink spray device with a water filter container mounted on a downstream end.

DETAILED DESCRIPTION OF THE INVENTION

Figures 1, 9:
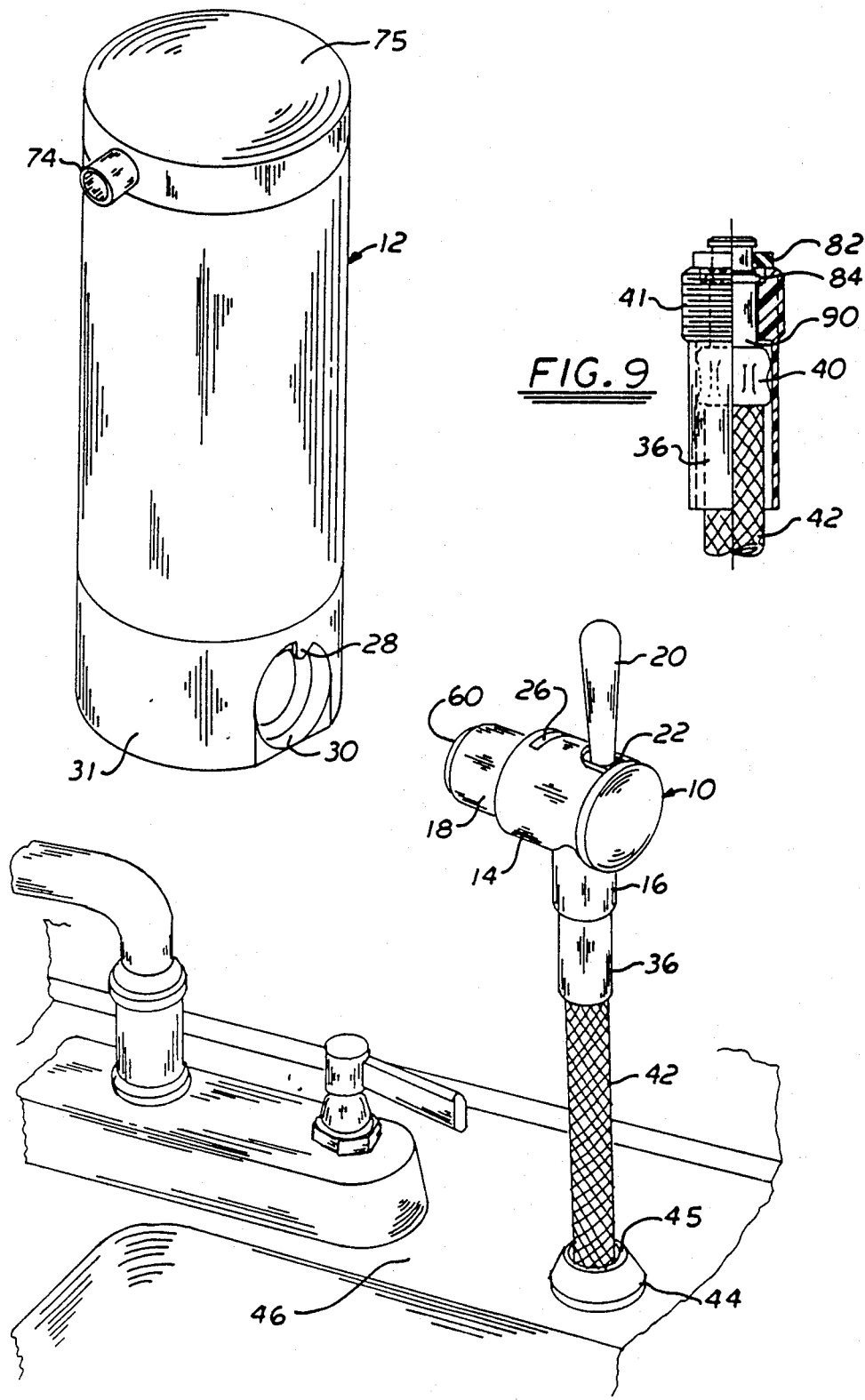
FIG. 1 is a perspective view of the sink spray and water filter apparatus in relation to a sink.
FIG. 9 is a detailed elevation partially in section of the annular hose connector.

Throughout the following detailed description the same reference numerals refer to the same elements in all figures.

The apparatus of this invention combines a sink spray 10 with a water filter 12 to provide a compact inexpensive way to treat tap water.

The sink spray 10 is generally cylindrical in shape and can conveniently be made from injection molded plastic materials such as DuPont Delrin§ or Celanese Celcon§. Three basic parts of the spray housing include the valve housing 14, an integral cylindrical vertical stem 16 and an integral cylindrical horizontal stem 18. The valve housing 14 has an actuating lever 20 inserted through an opening 22 to the interior of valve housing 14 where it is capable of actuating a valve 24. Additionally, the valve housing 14 has a lock tab slot 26 which accommodates a locking tab 28 from the inlet end 30 of the water filter 12. Movement of the locking tab 28 through groove 102 past notch 103 places it in a first position 32. When tab 28 is moved to a second position 34 it opens valve 24.

The water filter chamber 12 is usually cylindrical in shape, but can have varied configurations. The inlet 30 is located at the bottom 31 of the chamber and the outlet 74 is located at the top 75 of the chamber.

The vertical stem 16 of the sink spray 10 is threaded at its upstream end to an annular hose connector 36. The annular hose connector 36 separates the vertical stem 16 from the flexible water conduit 42 which in turn is attached to a water supply. This conduit 42 provides the means for the water supply to reach the sink spray 10. The standard features of the hose parts including flexible hose 42, metal hose connector 40 and its nylon bushing 90 are connected over the downstream end of connector 36 by insertion of a metal snap ring 84. A washer 82 downstream from ring 84 prevents leakage at this connection. The downstream end of connector 36 has male threads 41 which engage the upstream threads on the inner surface of vertical stem 16.

For purposes of this specification the water source in the conduit 42 is the furthest upstream point and the water outlet 74 is the furthest downstream point.

The flexible water conduit 42 moves up and down through receptacle 44 attached to sink 46. Its lowest position is determined by the upstream edge 38 of the vertical stem 16 which rests on the top surface 45 of the recepticle 44. The flexible water conduit 42 can be connected to any water supply source containing potable water.

Figure 2:
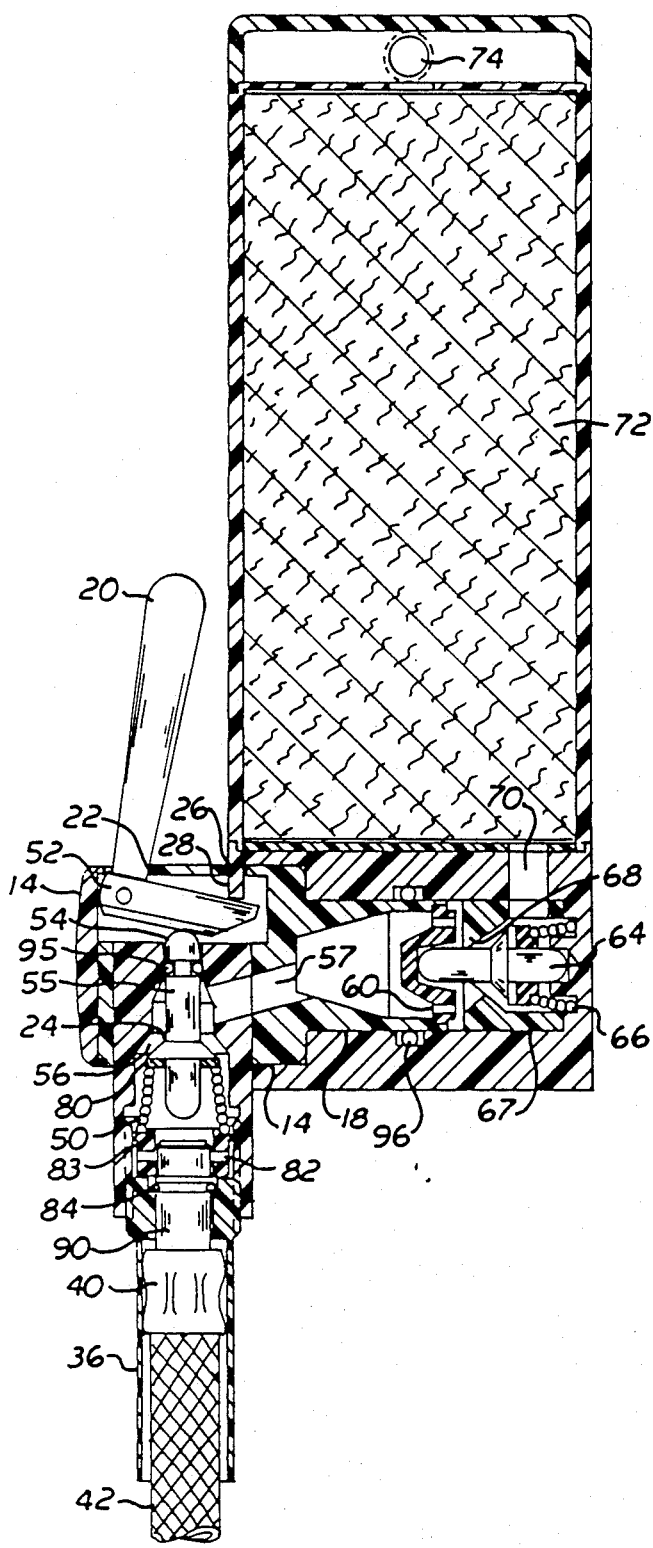
FIG. 2 is an elevation in section of the sink spray and water filter apparatus in an operational mode.

Valve 24 is normally in the closed position because of the action of spring 50 held in place by retainer 83. See FIG. 3. Movement of lever 20 in a direction towards the horizontal stem 18 causes an actuating member 52 attached to the lever 20 to press down on the downstream nipple 54 of valve 24. This causes the valve 24 to be depressed against its spring 50 and open chamber 56 to allow the flow of water from hose 42. See FIG. 2.

Figure 3:
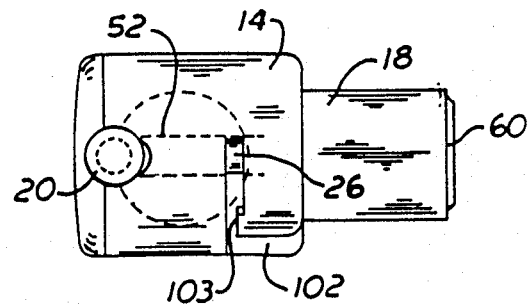
FIG. 3 is an elevation in section of the sink spray in a non-operating mode.

When the sink spray 10 is disconnected from the water filter 12, actuation of lever 20 causes water to spray from nozzle end 60. When in the upright position, lever 20, as shown in FIG. 3, has no action on valve 24 and consequently no water flows through the sink spray 10.

Upon insertion of the horizontal stem 18 into inlet 30 of water filter 12 and fully seating it, the valve 64 contained in a valve seat 67 within the water filter 12 is opened. This operation occurs when spring 66 is depressed because of the movement of valve 64 in response to pressure from the leading edge of horizontal stem 18. Water flows through channel 68 and then through inlet 70 to filter cartridge 72. The water is treated as it moves through the filter cartridge and exits through water outlet 74. Valve 64 can be removed when the filter material employed is sufficiently absorptive to prevent backflow of water from the upper portion of the container 12.

The mechanism for allowing the flow of water to move from conduit 42 when the water filter 12 is in place is not lever 20 but locking tab 28 which moves from a first position 32 as shown in FIG. 6 to a second position 34 as shown in FIG. 8. In position 34 the tab 28 depresses the actuating member 52 and causes valve 24 to be pressed against its spring 50 and thereby open channel 56 to allow the flow of water.

FIG. 5 shows the sink spray 10 and water filter 12 in a resting position and FIG. 7 shows the water filter 12 pulled down about 30 degrees to actuate valve 24 in the sink spray 10 and permit water to flow through channels 56, 57, 68, 70 and through the filter media in cartridge 72 to outlet 74.

The container 12 is designed to be a throw away so that when the capacity of the filter media is achieved, the container 12 is disconnected from sink spray 10 and replaced by a new container 12. Activated charcoal filters of the type described for this invention are expected to filter about 500 gallons of water before needing to be replaced. However larger or smaller filter containers can be employed depending on the needs of the consumer. A window containing a color indicator can be added to container 12 to alert the consumer when the capacity of the filter material is exceeded.

Seal 80 in valve 24 prevents leakage of water as does washer 82. Lock ring 84 holds the hose connection in place downstream from the annular hose connector 36. Nylon bushing 90 contains a groove for holding the lock ring 84. A standard hose fitting 40 is connected to nylon bushing 90 to make the water connection.

Figure 4:
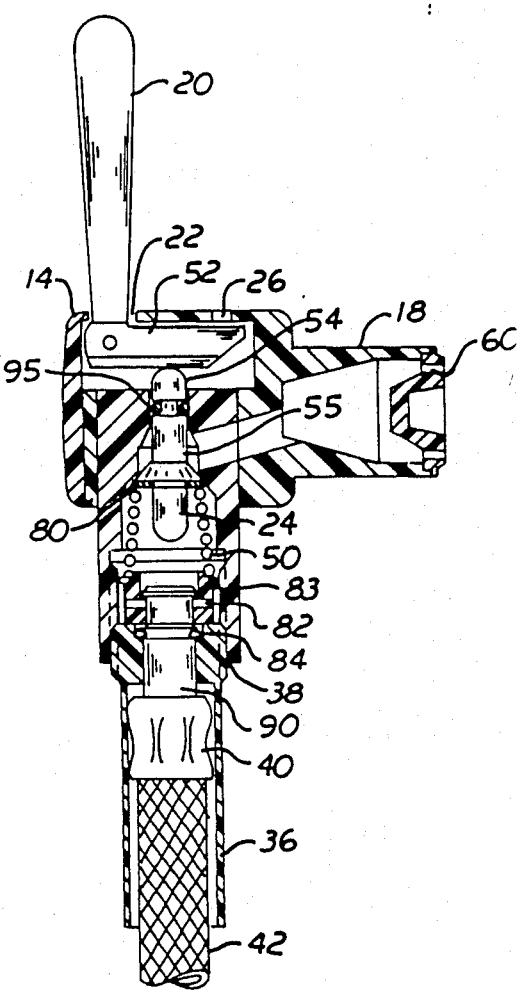
FIG. 4 is a plan view of the sink spray.

O-rings 95 between valve cap 54 and stem 55, as well as O-rings 96 in the horizontal stem 18 prevent leakage of water. An entrance slot 102 receives the locking tab 28 as shown in FIG. 4. Further movement of the tab 28 locks it into position beyond notch 103 in groove 26.

An alternate embodiment of this invention is shown in FIG. 10 wherein a quick disconnect connector 105 having an outer adapter sleeve 106 connects a sink spray housing 10a to a water filter 12a. The spray end of the sink spray 10a is replaced with a collar 108 containing internal threads that engage with threads 110 on the downstream end of sink spray housing 10a. A nozzle end 109 attached to collar 108 is juxtaposed to the upstream end 114 of the filter 12a.

The sink spray housing 10a has an actuating handle 112 opening an internal one way valve to allow water to flow through housing 10a. The water is fed through flexible hose 42 into the vertical stem 16a. Water flows through the water filter 12a and out through outlet 74a when the handle 112 is depressed.

The housing 115 snaps over the upstream end 114 of the water filter 12a. O-rings 116 insure that leakage does not occur. The connector 105 has a series of ball bearings 111 retained in ball bearing holes 113 in the ball retaining housing 115. Retaining rings 117 maintain the position of the housing 115. Downward movement of sleeve 106 causes the connector 105 to disengage and separate the sink spray 10a and the filter 12a.

The filter cartridge can contain activated charcoal, coral sand, ion exchange resins or other filter media. The water filter container 12 can also contain additive ingredients downstream of the filter such as calcium or magnesium to add desirable minerals to the water. Various flavorings can be added to the water outlet 74 so that the water runs through the flavoring and gives added taste to the water.

Equivalent valves and mechanisms can be substituted for the various valves and mechanisms of the present invention without departing from its scope.

Having thus described the invention what is claimed and desired to be secured by Letters Patent is:

1. A combination sink spray and water filter apparatus comprising
a sink spray housing, a discrete external water filter container rotatably mounted on an exterior surface of a downstream end of the sink spray housing, a filter media contained within the water filter container, and the sink spray housing attached to a water supply conduit at an upstream end so that water flowing through the sink spray housing can be directly routed to the water filter container.

2. A combination sink spray and water filter apparatus comprising a sink spray housing, a discrete external water filter container rotably mounted on a downstream end of the sink spray housing, the sink spray housing having a groove on its exterior surface to accept a tab mounted within an inlet to the water filter, the tab rotably moving from a first position in the groove to a second position in the groove to open a valve within the sink spray housing and permit water to flow from a supply conduit through the sink spray to the water filter container.

3. An apparatus according to claim 2 wherein the sink spray housing is inserted a sufficient distance into the inlet of the water filter container to mechanically open a valve within the water filter container.

4. An apparatus according to claim 3 wherein the sink spray housing has three integral components, a first upstream component attached at its upstream end to a water conduit and at its downstream end integral with a second valve housing component, the valve housing component integral at its downstream end with a downstream third component, the third downstream component being fully inserted into the inlet to the water filter together with a portion of the second valve housing component which contains the groove.

5. An apparatus according to claim 4 wherein the valve housing component and its upstream first integral component enclose a two-way valve that is actuated alternatively by a lever mounted through a hole in the valve housing component or by the tab from the water filter.

6. An apparatus according to claim 4 wherein the first upstream component is attached to the water conduit with an annular hose connector at its upstream end.

7. An apparatus according to claim 6 wherein a downstream end of the annular hose connector is threaded to engage corresponding threads in the upstream portion of the first upstream component and the downstream portion of a standard hose connector is mounted over the downstream end of the annular hose connector.

8. A combination sink spray and water filter apparatus comprising:
(a) the sink spray having a substantially cylindrical valve housing with a vertical integral stem depending from the valve housing and attached to an annular hose connection which is connected to a water source at an end upstream from the valve housing, a horizontal integral stem depending from the valve housing on a different plane from the vertical stem and downstream of the valve housing, an actuating member mounted in an opening in the valve housing and controlling the opening and closing of a valve within the valve housing, a groove in a downstream portion of the valve housing for receipt of a locking tab from the water filter to secondarily control the opening and closing of the valve within the valve housing,
(b) the water filter having a cylindrical chamber enclosing a water filter cartridge, an inlet to accommodate the the valve housing, a valve at a downstream end of the inlet, the valve being opened by mechanical pressure exerted by the horizontal stem and closed by spring pressure when the horizontal stem is not present, the locking tab integrally attached at an upstream opening to the inlet and engaging the groove in the valve housing, the locking tab capable of moving from a first resting position in the groove to a second position which opens the valve in the valve housing, and an outlet downstream from the inlet and separated from the inlet by the filter cartridge.

9. A combination sink spray and water filter apparatus according to claim 8 wherein the filter cartridge contains activated charcoal.

10. A combination sink spray and water filter apparatus according to claim 8 wherein the filter cartridge contains coral sand.

11. A combination sink spray and water filter apparatus according to claim 8 wherein the filter cartridge contains ion exchange resins.

12. A combination sink spray and water filter apparatus according to claim 8 wherein the valves in the valve housing and the water filter are two-way valves.

13. A combination sink spray and water filter apparatus according to claim 8 wherein the valve housing and filter chamber are made from high strength polymers.

14. A combination sink spray and water filter apparatus according to claim 8 wherein the inlet is located at a bottom of the filter chamber and the outlet at a top of the filter chamber.

15. A combination sink spray and water filter apparatus according to claim 8 wherein the groove in the valve housing contains an entrance notch for slidably receiving the locking tab.

* * * * *